US012684133B2

(12) United States Patent
Kalva et al.

(10) Patent No.: US 12,684,133 B2
(45) Date of Patent: Jul. 14, 2026

(54) SYSTEMS AND METHODS FOR VIDEO CODING

(71) Applicant: OP Solutions, LLC, Amherst, MA (US)

(72) Inventors: Hari Kalva, Boca Raton, FL (US); Borivoje Furht, Boca Raton, FL (US); Velibor Adzic, Canton, GA (US)

(73) Assignee: OP Solutions, LLC, Amherst, MA (US)

( * ) Notice: Subject to any disclaimer, the term of this patent is extended or adjusted under 35 U.S.C. 154(b) by 0 days.

(21) Appl. No.: 18/646,927

(22) Filed: Apr. 26, 2024

(65) Prior Publication Data

US 2024/0298006 A1     Sep. 5, 2024

Related U.S. Application Data

(63) Continuation of application No. PCT/US2022/047361, filed on Oct. 21, 2022.

(60) Provisional application No. 63/271,850, filed on Oct. 26, 2021, provisional application No. 63/271,884, filed on Oct. 26, 2021.

(51) Int. Cl.
*H04N 19/156* (2014.01)
*H04N 19/436* (2014.01)
*H04N 19/463* (2014.01)

(52) U.S. Cl.
CPC ......... *H04N 19/156* (2014.11); *H04N 19/436* (2014.11); *H04N 19/463* (2014.11)

(58) Field of Classification Search
CPC .. H04N 19/156; H04N 19/436; H04N 19/463;
H04N 19/177; H04N 19/12; G06N 3/0495; G06N 3/088; G06N 3/09; G06N 3/045; G06N 3/0464; G06N 3/08
See application file for complete search history.

(56) References Cited

U.S. PATENT DOCUMENTS 10,979,718 B2     4/2021  Chou et al.
11,202,088 B2 *  12/2021  Kitamura ............... H04N 19/46
2018/0338151 A1 * 11/2018  Coulombe ........... H04N 19/136
(Continued)

OTHER PUBLICATIONS

"H.264/AVC Entropy Decoder Complexity Analysis and its Applications", Lee et al., Vis. Commun. Image R. 22 (2011).
(Continued)

*Primary Examiner* — Tracy Y. Li
(74) *Attorney, Agent, or Firm* — OP Solutions IP Department; Paul Ackerman

(57) ABSTRACT

A system for low complexity and/or energy efficient encoding includes an encoding device, the encoding device configured to select a video application for an input video, set at least a boundary parameter, determine at least a goal parameter, generate a plurality of tool combinations, wherein each tool combination of the plurality of tool combinations has fewer tools than the full encoder toolset, tabulate measurements of each tool combination of the plurality of tool combinations, and select a tool combination of the plurality of tool combinations, wherein the selected tool combination generates optimal measurements as a function of the at least a goal parameter. An energy measurement device may be coupled to the encoding device and the selected tool combination may achieve the goal parameter at the highest energy efficiency.

16 Claims, 9 Drawing Sheets

(56)     References Cited

U.S. PATENT DOCUMENTS

| | | | |
|---|---|---|---|
| 2019/0045195 A1* | 2/2019 | Gokhale | ................ H04N 19/14 |
| 2020/0097389 A1* | 3/2020 | Smith | ................. G06F 11/0793 |
| 2022/0141455 A1* | 5/2022 | Cricri | ................... H04N 19/159 |
| | | | 375/240.02 |
| 2022/0172830 A1* | 6/2022 | Brooks | ................. G16H 40/67 |
| 2023/0291910 A1* | 9/2023 | Francois | ............. H04N 19/156 |
| 2024/0010282 A1 | 1/2024 | Schmitz | |

OTHER PUBLICATIONS

EPO Extended Search Report in corresponding application 22887970. 6, Aug. 26, 2025.

* cited by examiner

200

Video Encoding
server
(VVC)

← Network protocol →

Energy
Measurement
Device

202

204

Parameter data

Convolutional Neural Network

Deep Neural Network

Input picture

302

305

Concatenated input vector

310

700

800

ENTROPY DECODER PROCESSOR 804

INV. QUANT / INV. TRANSF 808

DE-BLOCKING FILTER 812

MOTION COMP. 820

INTRA PREDICTION 824

FRAME BUFFER 816

SYSTEMS AND METHODS FOR VIDEO CODING

CROSS-REFERENCE TO RELATED APPLICATIONS

The present application is a continuation of International Application PCT/US22/47361 filed on Oct. 21, 2022, and entitled SYSTEMS AND METHODS FOR VIDEO COD-ING, which application claims the benefit of priority to U.S. Provisional Patent Application Ser. No. 63/271,850 filed on Oct. 26, 2021, entitled Systems and Methods for Low-Complexity Video Coding and also claims the benefit of priority to U.S. Provisional Patent Application Ser. No. 63/271,884 filed on Oct. 26, 2021, and entitled Systems and Methods for Energy Efficient Video Coding, the disclosures of which are hereby incorporated by reference in their entireties.

FIELD OF THE INVENTION

The present invention generally relates to the field of video encoding and decoding. In particular, the present invention is directed to systems and methods for low-complexity and/or energy efficient video coding.

BACKGROUND

A video codec can include an electronic circuit or soft-ware that compresses or decompresses digital video. It can convert uncompressed video to a compressed format or vice versa. In the context of video compression, a device that compresses video (and/or performs some function thereof) can typically be called an encoder, and a device that decom-presses video (and/or performs some function thereof) can be called a decoder.

A format of the compressed data can conform to a standard video compression specification. The compression can be lossy in that the compressed video lacks some information present in the original video. A consequence of this can include that decompressed video can have lower quality than the original uncompressed video because there is insufficient information to accurately reconstruct the origi-nal video.

There can be complex relationships between the video quality, the amount of data used to represent the video (e.g., determined by the bit rate), the complexity of the encoding and decoding algorithms, sensitivity to data losses and errors, case of editing, random access, end-to-end delay (e.g., latency), and the like.

Motion compensation can include an approach to predict a video frame or a portion thereof given a reference frame, such as previous and/or future frames, by accounting for motion of the camera and/or objects in the video. It can be employed in the encoding and decoding of video data for video compression, for example in the encoding and decod-ing using the Motion Picture Experts Group (MPEG)'s advanced video coding (AVC) standard (also referred to as H.264). Motion compensation can describe a picture in terms of the transformation of a reference picture to the current picture. The reference picture can be previous in time when compared to the current picture, from the future when compared to the current picture. When images can be accurately synthesized from previously transmitted and/or stored images, compression efficiency can be improved.

SUMMARY OF THE DISCLOSURE

Systems and methods of video encoding are provided which result in reduced encoder complexity and/or increased energy efficiency while achieving encoding performance at a goal parameter. The encoding method comprising select-ing, by an encoding device, a video application for an input video and setting at least a boundary parameter and deter-mining at least one goal parameter. The encoder generating a plurality of potential tool combinations, wherein each tool combination of the plurality of tool combinations is a subset of the full encoder toolset. For each tool combination, tabulating performance data and selecting a tool combina-tion of the plurality of tool combinations, as a function of the measurements and the at least a goal parameter. In some embodiments, goal parameters may include bit rate, perfor-mance, energy efficiency, and/or complexity.

In some embodiments, the encoding system may include, or be coupled to, an energy measurement device. The tabulating operating may include recording both perfor-mance measurements and power consumption measure-ments of each tool combination of the plurality of tool combinations. Selecting may then include selecting a tool combination as a function of the combination of perfor-mance, power consumption, and/or complexity.

The tabulating and/or selecting operations may eliminate any tool combinations that exceed, or do not satisfy, the boundary parameter.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumen-talities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Figure 1:
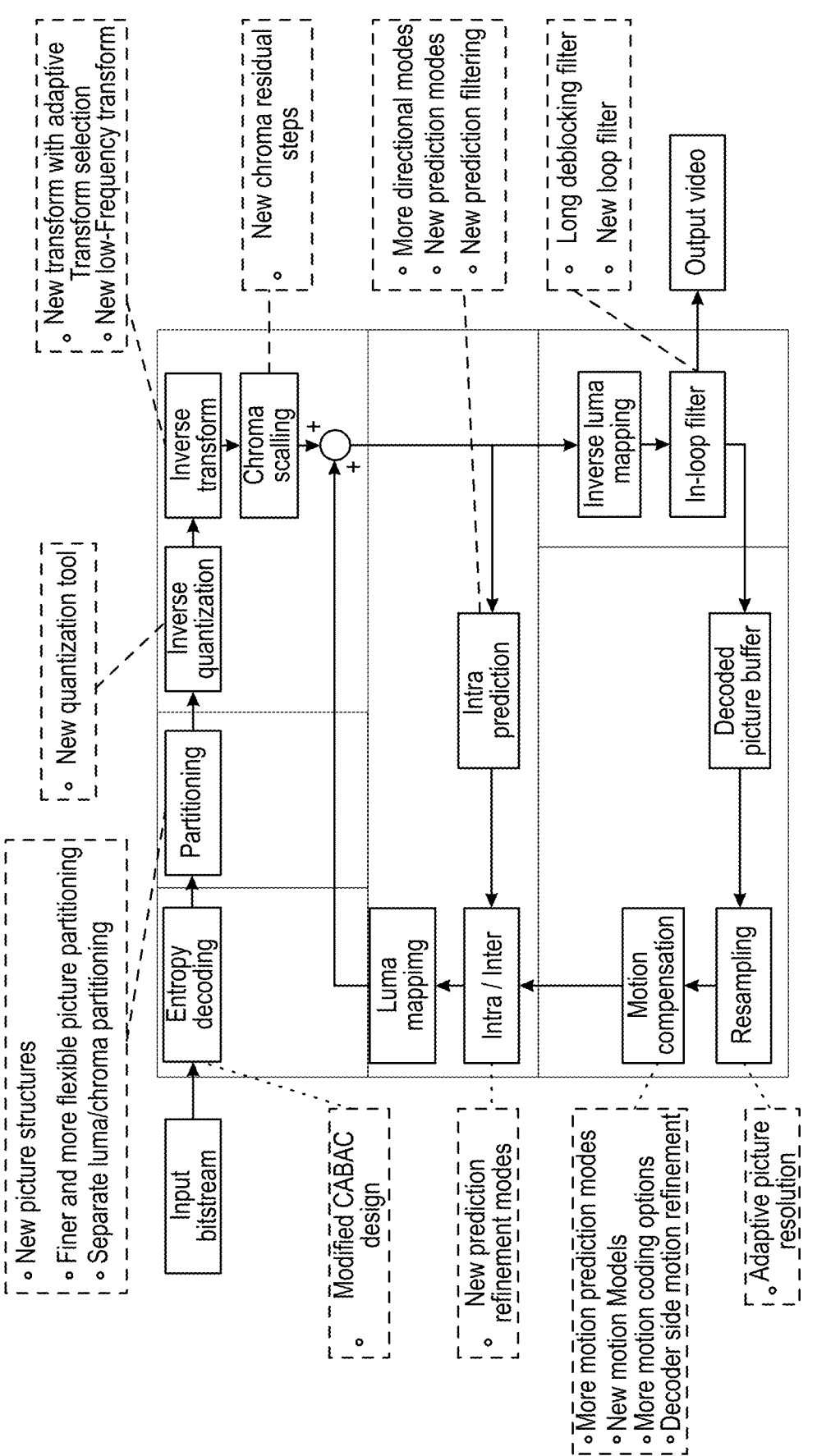
FIG. 1 is a block diagram illustrating an exemplary embodiment of a toolset for video encoding, and in particu-lar, applicable to video encoding using the VVC encoding standard.

Video encoding and decoding standards such as the versatile video coding (VVC) standard may be developed for high-definition videos. For instance, VVC was originally developed for 4K (3840×2160) and 8K (7680×4320) 10-bit video, up to 120 fps mostly for professional generated content. High efficiency video encoding (HEVC) was also designed for high levels of resolution. Encoding technology can also be complex in terms of computational elements and resources. For instance, compared to HEVC, VVC improves compression efficiency by 40%; however, a VVC encoder is about 5 times more complex than HEVC encoder, and VVC decoder is about 1.5 times more complex than HEVC decoder. This can impose high demand on computational resources, with the possible effect of limiting contexts in which such encoding and decoding protocols are useful. This increase in compression efficiency, however, can also come at a cost in energy efficiency, as greater complexity can produce a concomitant increase in energy demands for a given hardware platform and/or architecture. For instance, and without limitation, VVC has improved compression efficiency compared to the HEVC (H.265) and the AVC (H.264) standards, but consequently has increased energy consumption. As a non-limiting example, for illustrative purposes, FIG. 1 provides a block diagram of a VVC decoder including several features and functional blocks introduced thereby. As illustrated in FIG. 1, the improvements in compression efficiency in VVC has come, in part, as a result of an increased tool set and increased complexity in the encoder to implement new features.

Embodiments described herein select and/or are configured to select reduced VVC or other video compression tools; reduced VVC tools may still provide high compression efficiency but reduce the energy consumption. In other words, a relatively small reduction in compression efficiency, or a reduction that may be unnoticeable or unimportant for a given application or function, may, through application of methods described in this disclosure, lead to a relatively large reduction in energy consumption. Systems and/or components described herein may measure power consumption of an encoder such as without limitation a VVC encoder while removing tools thereof, and select a set of reduced tools that provides minimal energy consumption while still maintaining the target performance close to performance of a full set of encoder tools. It will be appreciated that in evaluating encoder/decoder system performance various metrics may be employed. As used herein, performance, P is generally discussed in terms of peak signal to noise ratio (PSNR). It will be appreciated, however, that this is merely exemplary and other performance measures may also be used such as a Structural Similarity Index (SSIM) or Visual Information Fidelity (VIF) and that the term performance is intended to reflect any absolute or relative measure of the quality and/or quantity of system operation or throughput.

There are many contexts and technological environments in which high-complexity and/or high-resolution video encoding and decoding are not necessary. For example, many video applications including Internet video, gaming, e-commerce, mobile video applications typically use 8-bit 4:2:0 video content, while some wireless networks use 384×216 low-bit video applications.

Disclosed herein are method and systems for low-complexity encoders, such as low complexity VVC encoders, for low-bit rate applications. Some embodiments described in this disclosure may significantly reduce complexity of an encoder such as a VVC encoder while maintaining efficiency, such as coding efficiency of a VVC system, and/or while retaining desirable characteristics and/or use of coding streams such as a VVC coding stream. Embodiments described in this disclosure may result in a significant reduction in memory usage and/or improved ability to parallelize encoding using hardware and/or software instructions that take advantage of parallelization, such as single instruction, multiple data (SIMD) instructions. Although VVC is used as an example in the illustrations to follow, embodiments provided in this disclosure may alternatively or additionally be applicable to other video encoders and/or decoders such as without limitation AVC (H.264), HEVC (H.265), AV1, or the like.

As a non-limiting example, application to a video of VVC encoding using (a) full VVC encoding that incorporates all tools available therewith using a 4K video, (b) use of full VVC and a low bit-rate video, and (c) use of a low-complexity VVC, defined for the purposes of this disclosure as a VVC in which some tools are disabled, to low-bit rate video are described in brief below.

Full VVC applied to 4K video may have a Rin=38420× 2160×120 fps×3 colors~4000×2000×120×3=2,880 Mbps. Assuming VVC compression equal to 200: a resulting compressed video rate may be Rout=2,880/200=14.4 Mbps, representing a high rate of output and a high complexity level.

In the case of full VVC applied to low bit rate video, for instance with Rin=100 Mbps, again assuming VVC Compression=200, an output of compressed video may have a rate Rout=100 Mbps/200=500 Kbps; while this output may have a far lower bitrate, complexity of the application may remain high.

Where low-complexity VVC as defined above is applied to low bit rate video, for instance with Rin=100 Mbps, a set output rate Rout=Rset=700 Kbps may be used in a non-limiting example. In an embodiment, reduction in tools providing compression may result in a compression of 140, and an output compressed video rate Rout=100 Mbps/ 140=714 Kbps. Thus, an output bitrate may be close to a bitrate seen with a full complement of VVC tools, while complexity may be reduced. This may result in an improved case of implementation using limited computer resources; in some embodiments, a greater ability to implement using parallel computing such as SIMD may result in performance improvements as well.

Figures 2, 3:
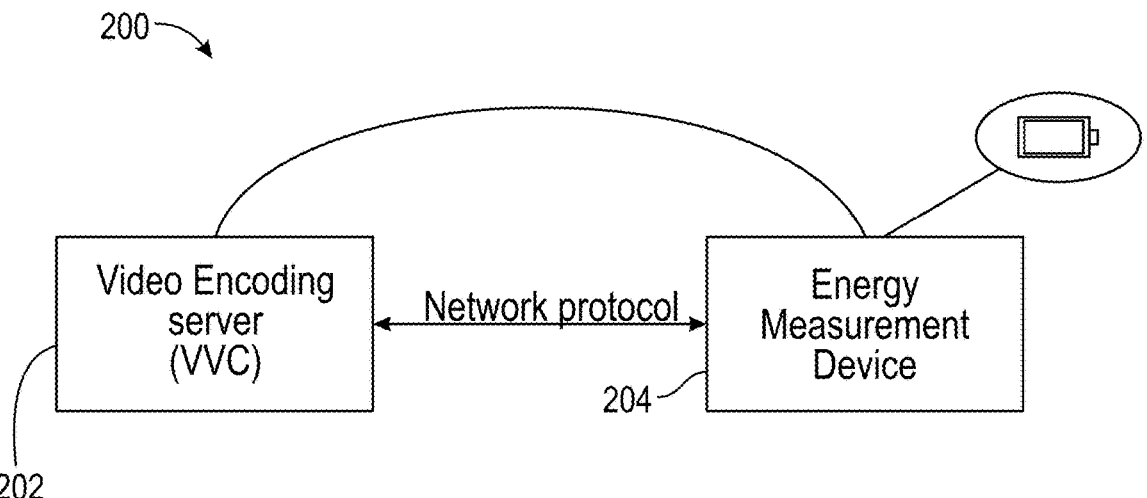
FIG. 2 is a block diagram illustrating an exemplary embodiment of a process for low complexity and/or energy efficient video encoding.
FIG. 3 is a block diagram illustrating a hybrid neural network.

Referring now to FIG. 2, a non-limiting embodiment of a process 200 for selecting tools to be used in low-complexity video encoding is illustrated. Process 200 may be configured to provide an optimal combination to maximize performance and minimize complexity for a given bitrate. In an embodiment, process 200 may include selecting a video application for which a low complexity VVC is to be designed and/or selection of related video sequences. As a non-limiting example, a video application may include gaming.

Still referring to FIG. 2, the non-limiting embodiment of a system 200 may also select tools to be used in energy-efficient video encoding. An energy measurement device 204 is connected between the encoding server 202 and power supply 206, typically connected to power source such as a wall socket, in order to measure real-time power consumption from the encoding system. Energy consumption may be measured from the time when encoder 202 is activated until it completes the video coding. Measurement of energy may be accomplished in any suitable manner. For instance, and without limitation, an ammeter may be used to measure current passing through a power connection to encoder. Measured power may be used to generate training data associating tools as used in one or more contexts with levels of power consumption and/or with coding efficiency. Training data may in turn be used to train a machine-learning model such as a neural network and/or hybrid neural network as described in further detail below. A machine-learning model in turn may be used to select tools to be used in encoding a video having one or more characteristics.

Still referring to FIG. 2, process 200 may include applying an encoder, such as without limitation a VVC encoder, using all tools available with that encoder and/or type of encoder. Application of encoder may include, without limitation, accessing an encoder that has been implemented in hardware and/or in software, selecting a type of encoder to be used, instantiating the encoder, or the like. One or more portions of a video may be encoded using an encoder having a full complement of features.

With continued reference to FIG. 2, process 200 may include disabling some tools and/or groups of tools to create a low-complexity encoder. In an embodiment, a computing device performing process 200 may measure one or more parameters of low-complexity encoder and/or an output thereof may be determined; such parameters may include, without limitation, output rate in kilobits per second (Kbps), performance P in peak signal to noise ratio (PSNR) and/or complexity of the encoder measured as the encoder execution time, number of instructions, or the like. In a standard video encoder, a coding loop typically includes a hypothetical decoder. This decoder functionality within the encoder can be used to calculate a mean square error (MSE) and from that calculate a PSNR to evaluate performance.

Still referring to FIG. 2, process 200 may include evaluating results. Evaluation may include selection of one or more and/or various combinations of tools to provide an optimal combination of performance and complexity; a computing device and/or circuitry implementing method 200 may disable tools that have not been selected. For instance, and without limitation, selected tools may maximize a performance P while minimizing a complexity C and meeting a required rate in Kbps. This optimization may be performed without limitation by maximizing an objective function through computer optimization processes such as linear optimization or mixed-integer optimization, use of a greedy algorithm, and/or using one or more machine-learning process and/or model, and/or using a neural network or application thereof, including without limitation a hybrid neural network as described in further detail below.

As a non-limiting example of embodiments of tools from which selections may be made, VVC coding standard may be characterized as including nine major components; VVC components provide many new features compared to HEVC, as illustrated for non-limiting exemplary purposes in Table 1.

TABLE 1

Major components of the VVC standard including new features.

| Coding component | VVC features |
| --- | --- |
| Partitioning | Low-level coding units finer splits |
| | Separate trees for luma and chroma |

TABLE 1-continued

Major components of the VVC standard including new features.

| Coding component | VVC features |
| --- | --- |
| | High-level picture structure |
| | Maximum CTU size 128 × 128 |
| Intra Prediction | Conventional modes 65 angles and wade angle inter prediction |
| | New modes of prediction |
| | Prediction filtering |
| Inter Prediction | New motion models |
| | New motion vector prediction |
| | Motion vector coding and refinement |
| | Geometric partitioning mode |
| | Prediction refinement |
| Transform | Multiple type transforms |
| | Low-frequency non-separable transform |
| | Sub-block transform |
| Quantization | Dependent quantization |
| Resident Coding | Improved contextual coding of transform coefficients |
| | Join coding of transform coefficients |
| Entropy Coding | Multi-hypothesis probability estimation |
| | Context-adaptive probability window size |
| Loop Filters | Adaptive loop filter |
| | Cross-component adaptive loop filter |
| | Longer-tap deblocking filters |
| Others | Luma mapping with chroma residual scaling |
| | Reference picture resampling |

Still referring to FIG. 2, and as a further exemplary illustration, VVC coding tools may be grouped in some embodiments into 6 functional blocks: (1) Preprocessing, (2) Frame partitioning, (3) Prediction, (4) Transform and quantization, (5) In-loop filters, and (6) Entropy coding. Encoding features may be implemented using various coding tools, a non-limiting example of which are shown in Table 2.

TABLE 2

VVC Coding tools.

| Groups | Abbreviation | Tools |
| --- | --- | --- |
| Intra tool | MIP | Matrix based intra prediction |
| | MRLP | Multi-reference line prediction |
| | LFNST | Low frequency non-separable transform |
| | ISP | Intra-sub partitioning |
| | IBC | Intra block copy |
| | CCLM | Cross-component linear model |
| Transform tools | MTS | Multiple transform set |
| | SBT | Sub-block transform |
| | LFNST | Low frequency non-separable transform |
| | JCCR | Join coding of chrominance residuals |
| | DQ | Dependent quantization |
| In-loop filter tools | SAO | Sampled adaptive offset |
| | ALF | Adaptive loop filter |
| | CCALF | Cross component adaptive loop filter |
| | LMCS | Luma mapping with chroma scaling |
| Inter motion tools | AFF | Affine motion model |
| | TMVP | Temporal motion vector prediction |
| | AMVR | Adaptive motion vector resolution |
| | MMVD | Merge with MVD |
| | SMVD | Symmetric motion vector difference |
| | SbTMC | Subblock-based temp. merging candidates |
| Prediction blending tools | BCW | Bi prediction with CU weights |
| | GPM | Geometry partition |
| | CIIP | Combined intra/inter prediction |
| Prediction enhancement tools | DMVR | Decoder motion vector refinement |
| | BDOF | Bi-directional optical flow |
| | PROF | Prediction refinement using optical flow |

Referring now to FIG. 3, an exemplary embodiment of a hybrid neural network for optimized selection of coding tools is illustrated. Such an embodiment may be used for a system of reduced encoder complexity and/or energy efficient coding. In an embodiment, hybrid neural network may be comprised of a convolutional neural network (CNN) 305 and a deep neural network (DNN) 310. CNN 305 may receive a video picture 302 and/or several video frames as input. CNN 305 may process an input through a series of layers of convolution and pooling. A final pooling layer may be converted to a numerical vector. This vector may be concatenated with parameter data, which may include $R_{set}$, C, and/or any other relevant data. As used in this disclosure, a "vector" as defined in this disclosure is a data structure that represents one or more quantitative values and/or measures. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes.

Still referring to FIG. 3, a concatenated vector produced as described above may then be input to DNN 310, which may in turn be configured to output a tool set vector as an output. Tool set vector may contain a label for each tool set that is under consideration, such as without limitation "Full VVC," "Tool Set 1," "Tool Set 2," "Tool Set 3," "Tool Set 4," "Tool Set 5," "Tool Set 6," or the like. DNN 310 may be configured to use cross-entropy to assign probabilities for each tool set. The probabilities may represent probabilities and/or degrees of likely energy savings. In an embodiment, a tool set with a highest probability score may be selected and/or used for encoding; for example, and without limitation, a DNN output of (0.10, 0.10, 0.15, 0.60, 0.01, 0.01, 0.03) may indicate that "Tool Set 3" is an optimal choice for encoding a given input sequence with given input parameters. Table 3 illustrates a non-limiting example of expected results when applying process as described above to VVC toolsets.

TABLE 3

| Applying the method for selecting VVC tools for low-bit rate applications | | | |
|---|---|---|---|
| VVC Tools | Output rate (Rout) | Complexity C [Encoder time] | Performance P PSNR in dB |
| Full VVC | 500 | 50 | 24 |
| Tool Set 1 | 705 | 29 | 20 |
| Tool Set 2 | 840 | 20 | 18 |
| Tool Set 3 | 690 | 34 | 23 |
| Tool Set 4 | 702 | 10 | 16 |
| Tool Set 5 | 703 | 12 | 22 |
| Tool Set 6 | 705 | 21 | 23 |

Still referring to FIG. 3, in an example as illustrated by Table 3, an optimization process may select Tool set 5, which (1) may provide close to a required low-bit rate of 703 Kbps, while maintaining high performance P=22—close to a maximal performance Pmax=24, and reducing complexity to C=12 compared to full VVC, which may have, as a non-limiting example, complexity $C_{max}$=50. Tool set 4 in the above example may provide a lowest complexity of C=10; however its performance is significantly lower (P=16). Similarly, in the above-illustrated example Tool set 6 gives top performance (P=23), but its complexity is much higher compared to Tool set 5 (C=21 versus 12).

Figure 4:
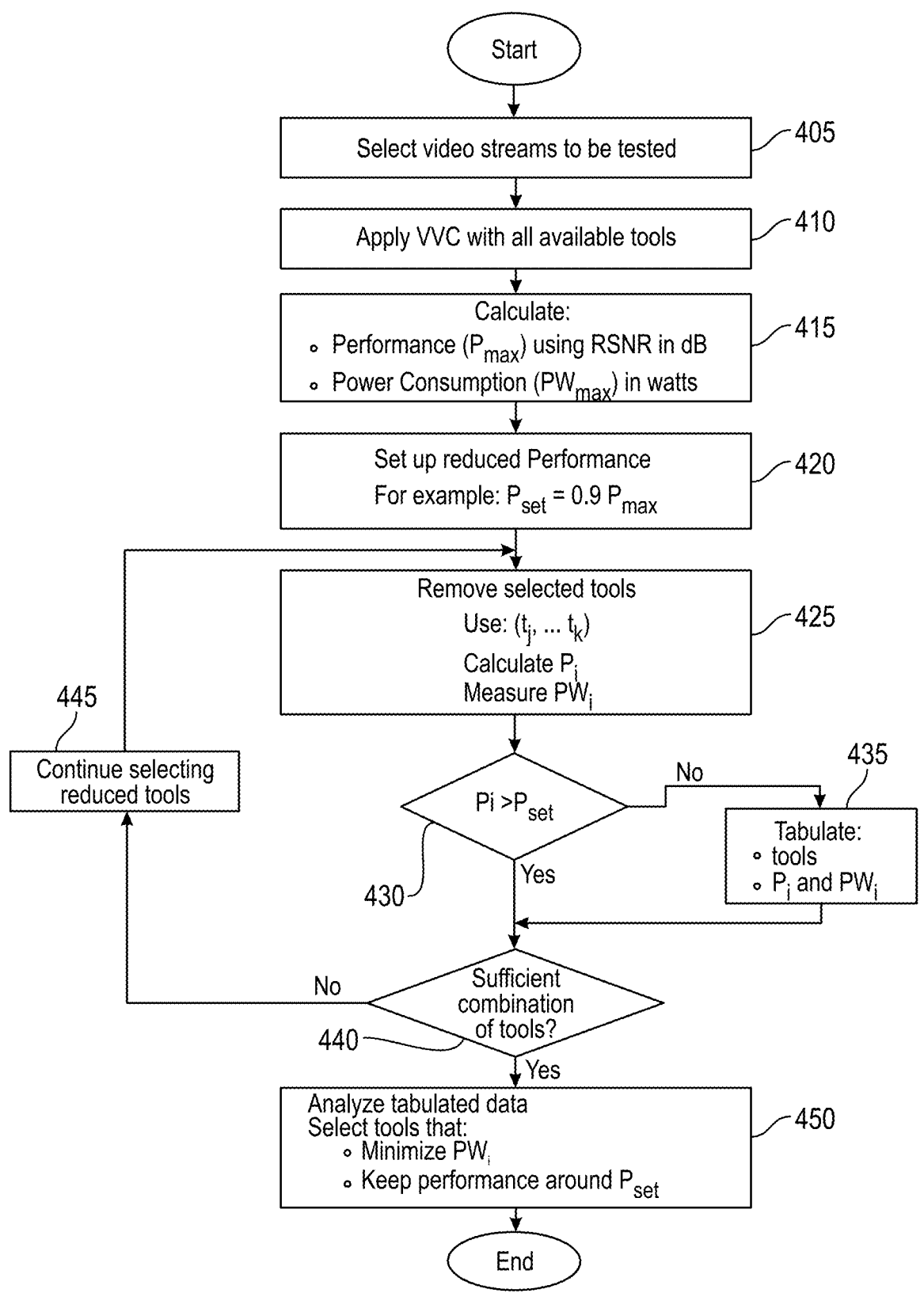
FIG. 4 is a flow diagram illustrating an exemplary embodiment of a method in accordance with the present disclosure of low complexity and/or energy efficient video encoding.

Referring now to FIG. 4, a flow diagram of an exemplary embodiment of a method 400 of optimization is illustrated. Method 400 may produce a required rate (Rset) and/or a rate maximally close thereto given available rates, while minimizing complexity C and maximizing performance P. At step 405, an encoding device, which may include any computing device and/or circuitry capable of implementing an encoder, may select a video application and related video sequences. Selection may be performed by reception of a video file, a video stream, a message and/or datum indicating a video file, video stream, and/or application, and/or a user instruction indicating a video file, video stream, and/or application.

Still referring to FIG. 4, encoding device may set boundary parameters, which may include without limitation a rate R in Kbps, which may be denoted $R_{set}$. R may be selected to meet a low-bit rate application. At step 410, encoding device may apply a full encoder, such as a VVC encoder or other encoder using all available tools, on sequences input, and in step 415 calculate full output parameters thereof, which parameters may include without limitation maximal rates achievable by any selection, which may include without limitation rate in Kbps ($R_{min}$), performance in PSNR ($P_{max}$) and/or complexity in encoding time ($C_{max}$). In step 420, the parameters for acceptable reduced performance may be set.

With continued reference to FIG. 4, in steps 425-450, an iterative process may be employed in which the encoding device may generate a plurality of combinations of tools, each combination of plurality of combinations generated by removing a one or more tools; a set of tools removed for any given combination of plurality of combinations may differ from the set of tools removed for each other combination of the plurality of combinations. Encoding device may calculate rate, performance, and/or complexity for each applied set of tools (Ri, Pi, and Ci) of each the $i^{th}$ combination of the plurality of combinations.

Still referring to FIG. 4, at step 425, encoding device may eliminate each tool combination having one or more parameters violating boundary parameters. For instance, and without limitation, if for combination i Ri>Rset encoding device may eliminate this tool combination, because the rate is higher than the required rate.

In decision step 430 the performance of a current set of selected tools is compared to that of the set reduced performance level. If that iteration of tools has performance that exceeds the acceptable performance level, flow proceeds to step 440. Otherwise, the process moves to step 435. At step 435, and still referring to FIG. 4, for each tool combination not eliminated in step 425, such as without limitation each tool combination for which Ri<=Rset, encoding device may tabulate the selected tool set and related measurements, such as without limitation Ri, Pi, and/or Ci. Encoding device may continue the above, selecting different combinations of tools until sufficient combinations of tools are selected, where sufficient different combinations may include a number of distinct combinations in excess of a preconfigured threshold, a number determined by a machine-learning process or other process as representing a sufficient number to optimize to a threshold level of accuracy, or the like.

At step 450, encoding device may analyze results and select a combination of tools that provides close R to Rset, performance P as close as to full VVC and/or other full tool complement for a given coding standard, and minimize complexity C. This may be performed using any process described in this disclosure. This method may be used to select a tool set for encoding a specific video, and/or to train a machine-learning model, such as any described herein, which is able to select tool sets for future videos and/or video sequences to reduce complexity.

Referring again to FIG. 4, the exemplary embodiment of a method 400 can provide for energy efficient encoding. In such an example, at step 410, encoding device may apply a full encoder, such as a VVC encoder or other encoder using all available tools, on sequences input, and at step 415 may calculate full output parameters thereof, which parameters may include without limitation a performance P, referred as $P_{max}$ in dB and a measured power consumption $PW_{max}$ in Watts.

Still referring to FIG. 4, at step 420, encoding device may set up and/or determine a reduced performance, which will still meet the application requirements; for example $P_{set}=0.9$ Pmax, which is 90% from the full performance measured above. At step 425, encoding device may start removing the tools, for instance and without limitation generating one or more tool combinations having one or more tools of full encoder selectively removed, and measuring performance $P_i$ and power consumption $P_{Wi}$ for a given tool combination i. In some embodiments, if $P_i>P_{set}$ encoding device may eliminate tool combination, tools, and tabulate results related Pi and PWi. in step 435 only if in step 430 $P_i<=P_{set}$. Encoding device may continue with selecting different tool sets until sufficient results are collected, which may be determined by a reduction in power consumption greater than a threshold number and/or greater than a threshold amount of reduction in performance.

At step 450, encoding device may analyze tabulated data and select a tool set that minimizes power consumption $P_W$ while keep performance close to $P_{set}$. This optimization may be performed without limitation by maximizing an objective function through computer optimization processes such as linear optimization or mixed-integer optimization, use of a greedy algorithm, and/or using one or more machine-learning process and/or model, and/or using a neural network or application thereof, including without limitation a hybrid neural network as described in this disclosure.

Table 4 shows an example of tabulated results and selecting a tool set, such as a VVC tool set, which optimizes energy consumption.

TABLE 4

| Applying the method for selecting VVC tools for reduced power consumption | | |
| --- | --- | --- |
| VVC Tools | Performance PSNR [dB] | Power Consumption [Watts] |
| Full VVC | 50 | 200 |
| Tool Set 1 | 44 | 180 |
| Tool Set 2 | 44.5 | 175 |
| Tool Set 3 | 40 | 165 |
| Tool Set 4 | 44.2 | 160 |
| Tool Set 5 | 37 | 155 |

In the above-presented example, encoding device may select tool set 4, which may provide low power consumption of 160 W compared to a full encoder (PW-200) while maintaining relatively good performance of P=44.2. Continuing the example, tool set 5 gives a lowest power consumption (PW=155 W), but its performance is also significantly reduced (P=37). This method may be used to select a tool set for encoding a specific video, and/or to train a machine-learning model, such as any described herein, which is able to select tool sets for future videos and/or video sequences to reduce power consumption.

Figure 5:
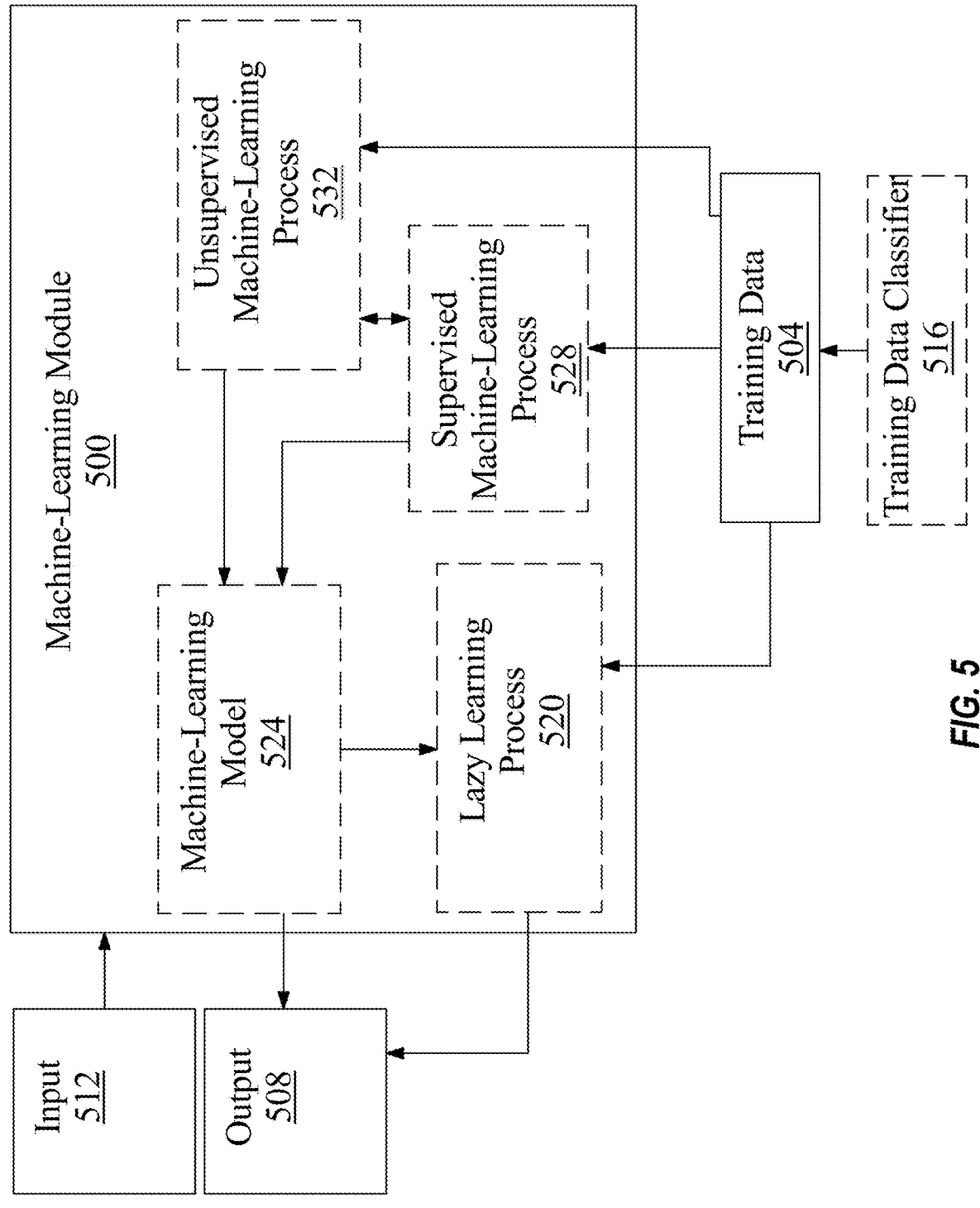
FIG. 5 is a block diagram illustrating an exemplary embodiment of a machine-learning module.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the clastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 6:
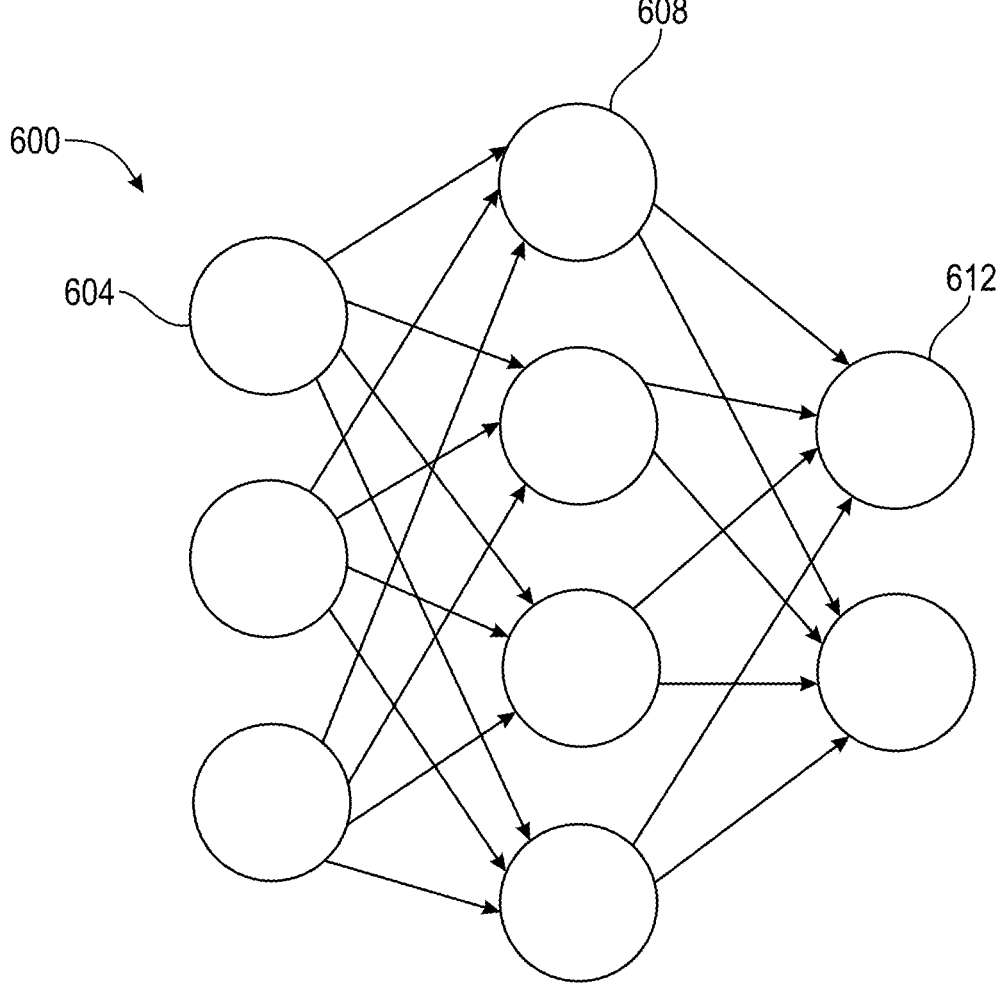
FIG. 6 is a schematic diagram illustrating an exemplary embodiment of neural network.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network."

Figure 7:
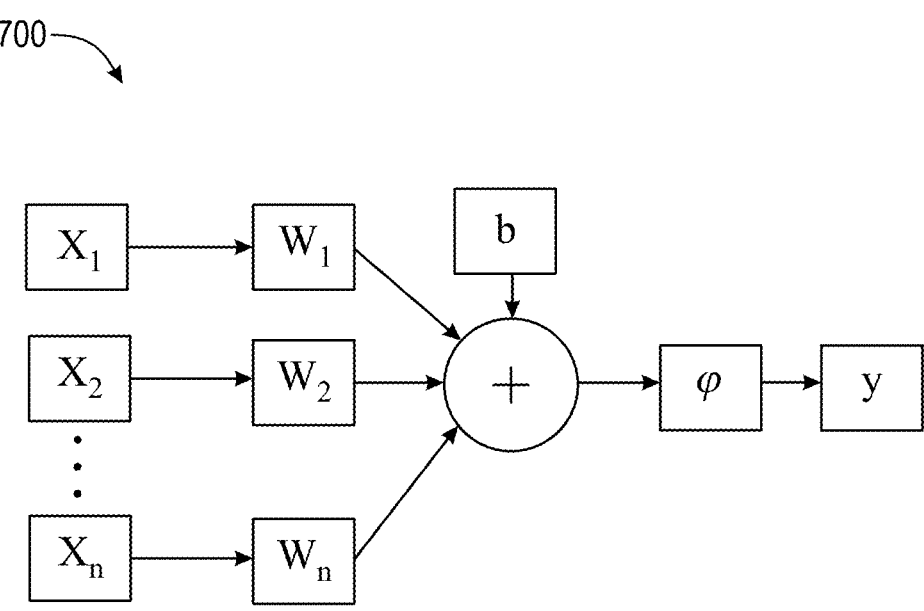
FIG. 7 is a schematic diagram illustrating an exemplary embodiment of a node of a neural network.

Referring now to FIG. 7, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function q, which may generate one or more outputs y. Weight wi applied to an input xi may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights wi may be determined by training a neural network using training data, which may be performed using any suitable process as described above.

Still referring to FIG. 7, a "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like. CNN may include, without limitation, a deep neural network (DNN) extension, where a DNN is defined as a neural network with two or more hidden layers.

Figure 8:
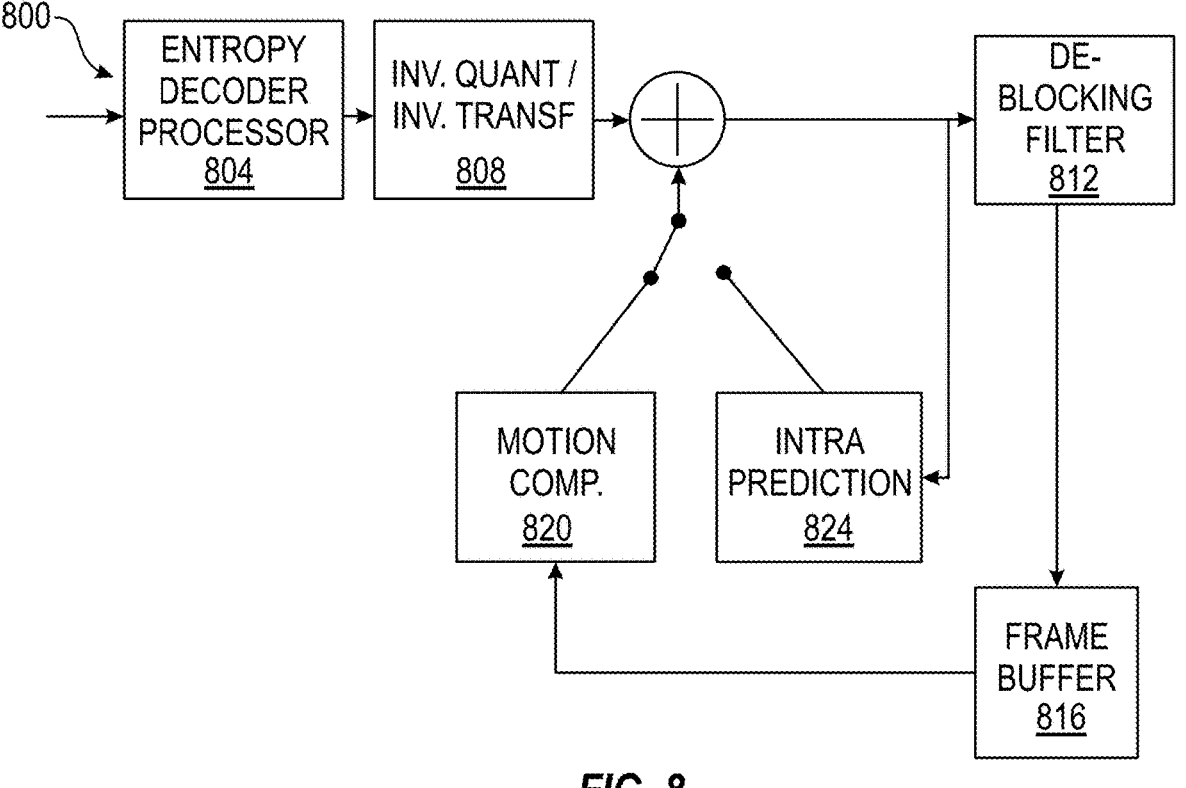
FIG. 8 is a block diagram illustrating an exemplary embodiment of a video decoder.

FIG. 8 is a system block diagram illustrating an example decoder 800 capable of adaptive cropping. Decoder 800 may include an entropy decoder processor 804, an inverse quantization and inverse transformation processor 808, a deblocking filter 812, a frame buffer 816, a motion compensation processor 820 and/or an intra prediction processor 824.

In operation, and still referring to FIG. 8, bit stream 828 may be received by decoder 800 and input to entropy decoder processor 804, which may entropy decode portions of bit stream into quantized coefficients. Quantized coefficients may be provided to inverse quantization and inverse transformation processor 808, which may perform inverse quantization and inverse transformation to create a residual signal, which may be added to an output of motion compensation processor 820 or intra prediction processor 824 according to a processing mode. An output of the motion compensation processor 820 and intra prediction processor 824 may include a block prediction based on a previously decoded block. A sum of prediction and residual may be processed by deblocking filter 812 and stored in a frame buffer 816.

In an embodiment, and still referring to FIG. 8 decoder 800 may include circuitry configured to implement any operations as described above in any embodiment as described above, in any order and with any degree of repetition. For instance, decoder 800 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Decoder may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 9:
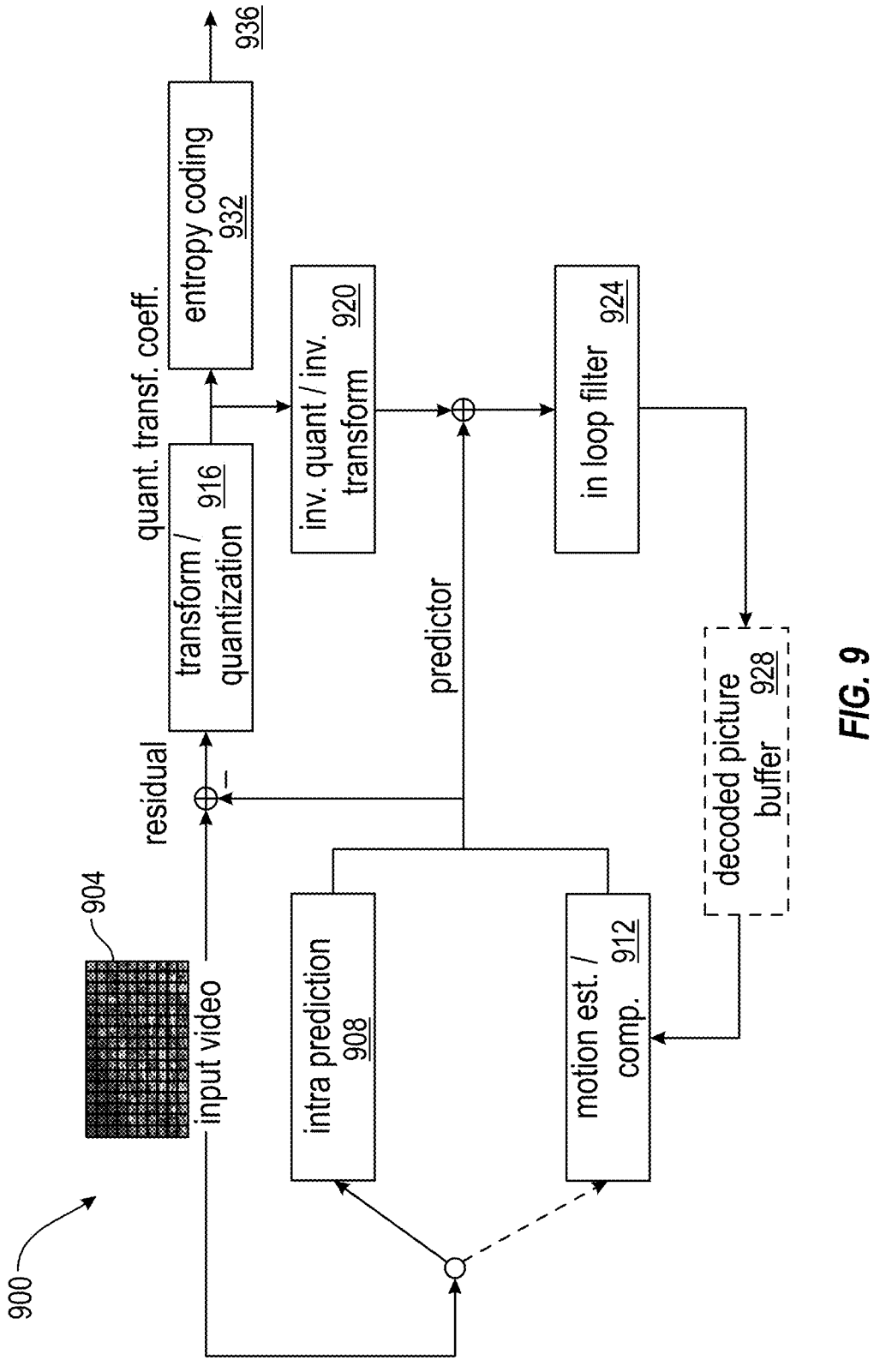
FIG. 9 is a block diagram illustrating an exemplary embodiment of a video encoder.

FIG. 9 is a system block diagram illustrating an example video encoder 900 capable of adaptive cropping. Example video encoder 900 may receive an input video 904, which may be initially segmented or dividing according to a processing scheme, such as a tree-structured macro block partitioning scheme (e.g., quad-tree plus binary tree). An example of a tree-structured macro block partitioning scheme may include partitioning a picture frame into large block elements called coding tree units (CTU). In some implementations, each CTU may be further partitioned one or more times into a number of sub-blocks called coding units (CU). A final result of this portioning may include a group of sub-blocks that may be called predictive units (PU). Transform units (TU) may also be utilized.

Still referring to FIG. 9, example video encoder 900 may include an intra prediction processor 908, a motion estimation/compensation processor 912, which may also be referred to as an inter prediction processor, capable of constructing a motion vector candidate list including adding a global motion vector candidate to the motion vector candidate list, a transform/quantization processor 916, an inverse quantization/inverse transform processor 920, an in-loop filter 924, a decoded picture buffer 928, and/or an entropy coding processor 932. Bit stream parameters may be input to the entropy coding processor 932 for inclusion in the output bit stream 936.

In operation, and with continued reference to FIG. 9, for each block of a frame of input video, whether to process block via intra picture prediction or using motion estimation/compensation may be determined. Block may be provided to intra prediction processor 908 or motion estimation/compensation processor 912. If block is to be processed via intra prediction, intra prediction processor 908 may perform processing to output a predictor. If block is to be processed via motion estimation/compensation, motion estimation/compensation processor 912 may perform processing including constructing a motion vector candidate list including adding a global motion vector candidate to the motion vector candidate list, if applicable.

Further referring to FIG. 9, a residual may be formed by subtracting a predictor from input video. Residual may be received by transform/quantization processor 916, which may perform transformation processing (e.g., discrete cosine transform (DCT)) to produce coefficients, which may be quantized. Quantized coefficients and any associated signaling information may be provided to entropy coding processor 932 for entropy encoding and inclusion in output bit stream 936. Entropy encoding processor 932 may support encoding of signaling information related to encoding a current block. In addition, quantized coefficients may be provided to inverse quantization/inverse transformation processor 920, which may reproduce pixels, which may be combined with a predictor and processed by in loop filter 924, an output of which may be stored in decoded picture buffer 928 for use by motion estimation/compensation processor 912 that is capable of constructing a motion vector candidate list including adding a global motion vector candidate to the motion vector candidate list.

With continued reference to FIG. 9, although a few variations have been described in detail above, other modifications or additions are possible. For example, in some implementations, current blocks may include any symmetric blocks (9×8, 16×16, 32×32, 64×64, 128×128, and the like) as well as any asymmetric block (8×4, 16×8, and the like).

In some implementations, and still referring to FIG. 9, a quadtree plus binary decision tree (QTBT) may be implemented. In QTBT, at a Coding Tree Unit level, partition parameters of QTBT may be dynamically derived to adapt to local characteristics without transmitting any overhead. Subsequently, at a Coding Unit level, a joint-classifier decision tree structure may eliminate unnecessary iterations and control the risk of false prediction. In some implementations, LTR frame block update mode may be available as an additional option available at every leaf node of QTBT.

In some implementations, and still referring to FIG. 9, additional syntax elements may be signaled at different hierarchy levels of bitstream. For example, a flag may be enabled for an entire sequence by including an enable flag coded in a Sequence Parameter Set (SPS). Further, a CTU flag may be coded at a coding tree unit (CTU) level.

Some embodiments may include non-transitory computer program products (i.e., physically embodied computer program products) that store instructions, which when executed by one or more data processors of one or more computing systems, cause at least one data processor to perform operations herein.

Still referring to FIG. 9, encoder 900 may include circuitry configured to implement any operations as described above in any embodiment, in any order and with any degree of repetition. For instance, encoder 900 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Encoder 900 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 9, non-transitory computer program products (i.e., physically embodied computer program products) may store instructions, which when executed by one or more data processors of one or more computing systems, causes at least one data processor to perform operations, and/or steps thereof described in this disclosure, including without limitation any operations described above and/or any operations decoder 900 and/or encoder 900 may be configured to perform. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, or the like.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
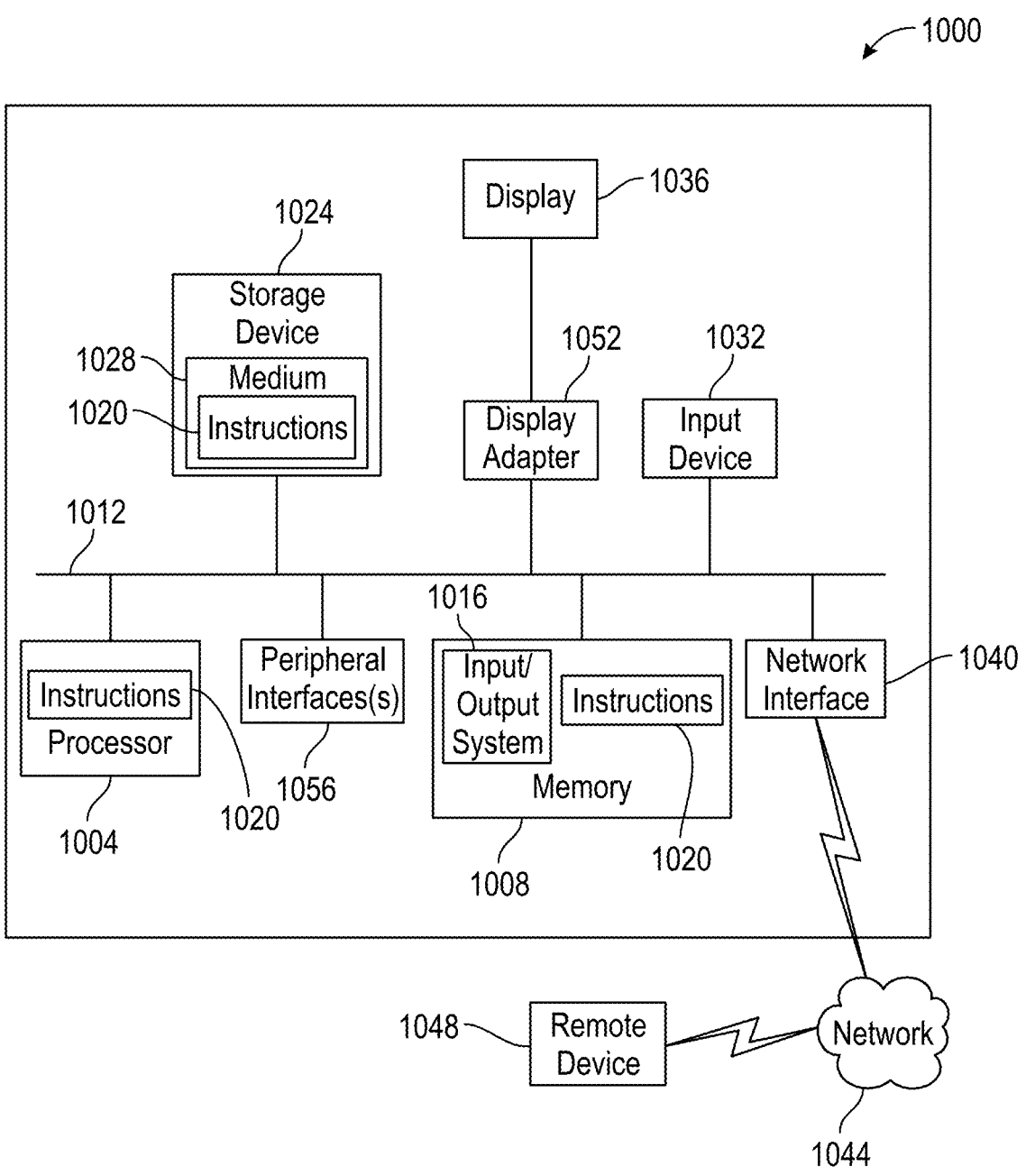
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus archi- tectures.

Processor 1004 may include any suitable processor, such as without limitation a processor incorporating logical cir- cuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard archi- tecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Pro- cessing Unit (TPU), analog or mixed signal processor, Trusted Platform Module (TPM), a floating-point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be remov- ably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIRE- WIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connect- ing computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral inter- face include, but are not limited to, a serial port, a USB connection, a FIREWIRE connection, a parallel connection, and any combinations thereof.

The foregoing has been a detailed description of illustra- tive embodiments of the invention. Various modifications and additions can be made without departing from the spirit and scope of this invention. Features of each of the various embodiments described above may be combined with fea- tures of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of video encoding, the method comprising:
selecting, by an encoding device, a video application for an input video;
setting, by the encoding device, at least a boundary parameter;
determining, by the encoding device, at least a goal parameter;
generating, by the encoding device, a plurality of tool combinations, wherein each tool combination of the plurality of tool combinations is a subset of the full encoder toolset;
tabulating, by the encoding device, performance and power consumption measurements of each tool combination of the plurality of tool combinations during video encoding; and
selecting, by the encoding device, a tool combination of the plurality of tool combinations, as a function of the performance and power consumption measurements and the at least a goal parameter.

2. The method of claim 1, wherein setting the boundary parameter includes setting a maximal bitrate.

3. The method of claim 2, wherein determining the at least a goal parameter further comprises:
measuring, by the encoding device and for a full encoder toolset, at least an output parameter; and
determining the at least a goal parameter as a function of the at least an output parameter.

4. The method of claim 2, wherein selecting the tool combination further comprises selecting the tool combination as a function of a rate of the tool combination, a performance of the tool combination, and a complexity of the tool combination.

5. The method of claim 4, wherein function reduces encoder complexity.

6. The method of claim 4, wherein the function optimizes compression performance for the goal parameter.

7. The method of claim 4, wherein the function minimizes divergence from a set output rate.

8. The method of claim 1, wherein selecting the tool combination further comprises selecting the tool combination as a function of a machine-learning model.

9. The method of claim 8, wherein the machine-learning model further comprises a hybrid neural network.

10. The method of claim 1, further comprising:
determining that at least a tool combination of the plurality of tool combinations has a parameter violating the at least a boundary parameter; and
eliminating the at least a tool combination.

11. A system for energy-efficient video encoding, the system comprising a power source, a video encoding device and a power measurement device coupled to the power source and encoding device for measuring power consumed by the encoding device, the encoding device configured to:
select a video application for an input video;
set at least a boundary parameter;
determine at least a goal parameter;
generate a plurality of tool combinations, wherein each tool combination of the plurality of tool combinations has fewer tools than the full encoder toolset;
tabulate performance measurements and power consumption measurements of each tool combination of the plurality of tool combinations; and
select a tool combination of the plurality of tool combinations, wherein the selected tool combination generates an optimal combination of performance and power consumption during video encoding.

12. The encoding device of claim 11, wherein setting the boundary parameter includes setting a maximal performance.

13. The encoding device of claim 11, wherein determining the at least a goal parameter further comprises:
measuring, by the encoding device and for a full encoder toolset, at least an output parameter; and
determining the at least a goal parameter as a function of the at least an output parameter.

14. The encoding device of claim 11, wherein selecting the tool combination further comprises selecting the tool combination as a function of a machine-learning model.

15. The encoding device of claim 14, wherein the machine-learning model further comprises a hybrid neural network.

16. The encoding device of claim 11, further configured to:
determine that at least a tool combination of the plurality of tool combinations has a parameter violating the at least a boundary parameter; and
eliminate the at least a tool combination.

* * * * *